2,893,964

WAX FORTIFIED PAINT AND VARNISH COMPOSITIONS

Edward A. Wilder, Racine, Wis., assignor to S. C. Johnson & Son, Inc., Racine, Wis.

No Drawing. Application December 10, 1954
Serial No. 474,588

2 Claims. (Cl. 260—19)

This invention relates to coating compositions and particularly to paint or varnish compositions containing one or more film-forming resins in solution in a common solvent or combination of solvents together with certain synthetic wax-like esters.

The beneficial results attainable by the addition of natural and synthetic waxes to protective coatings have been well established. Such components are well known for their ability to render a paint or varnish composition resistant to marring, abrasion, dirt, and mildew, and repellent to water.

Whereas natural waxes, including those of animal origin such as beeswax; vegetable waxes such as carnauba and ouricuri; and mineral waxes, especially the paraffins, have been employed as the wax components in protective coating compositions and have successfully imparted the desired characteristics to the films, nevertheless, these additives also impart certain undesirable physical properties. These materials have very limited solubility in varnishes and when incorporated even in very small amounts, destroy adhesion and inhibit film curing. Even with the incorporation of an efficacious drying agent, a paint containing one of the above waxes as a component produces a film requiring prolonged drying periods, often exceeding 72 hours.

Synthetic waxes such as that described in U.S. Patent No. 2,653,910 have been prepared in an attempt to minimize the above limitations. Whereas common solvents for both the resin and synthetic wax have been discovered for use in either varnish or paint compositions, nevertheless, upon evaporation of the solvent, the colloidally dispersed materials, being incompatible, tend to constrict, causing a haze or cloud to form in the film.

In accordance with this invention, it has been found that certain synthetic waxes which impart water-repellency and mar and abrasion resistance to a protective coating composition are completely compatible with the resinous constituent of such compositions, thereby precluding any molecular constriction or haziness in the dried film. This invention, therefore, relates to protective coating compositions comprising a resin, a thinner and a small amount of an ester prepared from a saturated monohydric alcohol of 16 to 30 carbon atoms and a tribasic acid of up to about 10 carbon atoms.

Resins suitable for use in the paint and varnish compositions of this invention, hereinafter referred to as coating resins, include the natural varnish resins, such as rosin or rosin esters; phenolic resins, which are usually products derived from the reaction of formaldehyde with paraalkyl substituted phenols; formaldehyde and melamine formaldehyde resins, especially where the paint product is to be converted by the application of heat; polystyrene resins such as styrene-modified material which may be copolymerized with unsaturated alkyd resins and drying oils; and materials such as polymethacrylic, coumarone and sulfonamide resins, chlorinated, epichlorhydrin-bisphenol condensation resins, etc. As is well known, the hard resins are preferably plasticized with, for example, drying oils or the like.

The amount of the synthetic wax of this invention suitable for use in protective coating compositions ranges from 0.5 to about 10%, based on the resin. Certain proportions may be more desirable, depending on the type of coating, the particular wax, and the end results desired. It has been found that the incorporation of from 0.5 to 5% of the subject synthetic waxes in oleoresinous, alkyd, and epoxy resin ester varnishes gives compositions producing dried films which are very water repellent, mar and abrasion resistant. Varnishes used as vehicles in pigmented paint products may in some cases advantageously contain even more than 5% wax, as high as 10%, based on the resin content. Amounts greater than about 10% have been found to impart no appreciable improvement to the coating compositions and adversely affect some types, causing a weakening of the film strength. Unlike natural waxes, the subject synthetic waxes are very soluble in varnish constituents, and when used in proper proportions, do not inhibit the curing of films by either air-drying or baking methods. Such cured films adhere well and form good surfaces for recoating in that paints and varnishes applied over them show good surface adhesion.

The saturated esters of this invention are esters formed by reacting a tricarboxylic acid, such as beta-carboxyadipic acid, with long-chain saturated alcohols. They may be represented by the following general formula:

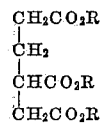

R is the residue of the long-chain saturated alcohol of at least 16 carbon atoms.

Since both the alcohols and the beta-carboxyadipic acid used in the preparation of these waxy esters have very high boiling points, the esters may be made by a direct application of heat to the reaction mixture removing water as it is formed from the condensation. This type of esterification is conveniently carried out at temperatures in the range of 200–250° C. The removal of water is facilitated by passing an inert gas through the reaction mixture during heating, or it may be removed by heating the long-chain alcohols with the tribasic acids in the presence of a solvent, adjusting the amount of solvent so that reaction temperature may be raised to 200° C. or higher, with the condensed solvent returning to the reaction mixture through a water trap, so that the water is removed from the reaction chamber as it is formed.

These waxy triesters may also be prepared at lower temperatures. It is most convenient to reflux the reactants in a mutual organic solvent, employing a mineral acid or a mineral acid salt as catalyst. This method is illustrated by the following which describes the preparation of the triester of octadecanol and beta-carboxyadipic acid.

19 grams (0.1 mol) of beta-carboxyadipic acid, 81 grams (0.03 mol) of Stenol (commercial grade of octadecanol, obtained from E. I. du Pont de Nemours & Company, Inc.), 2 ml. of concentrated $H_2SO_4$, and 375 ml. of benzene were charged into a 500 ml. flask and the mixture refluxed for 16 hours. (The amount of water that resulted from the reaction remained constant after the first 9¼ hours' refluxing.) The dark-colored benzene solution was treated twice with J-neutral activated clay with some lightening of the solution. This treatment was followed by a water wash. The solvent was evaporated, the residue redissolved and treated twice with activated carbon. Evaporation of the solvent yielded a light tan waxy material having an acid number of 1.9, melting point (capillary tube) of 49–52° C., and was completely soluble in varnish-type mineral spirits at 18% solids and 25° C.

The acid number as used herein is defined as the number of milligrams of potassium hydroxide required to neutralize the free acid in one gram of the sample.

Illustrative examples of the improved coating compositions of this invention are as follows:

*Example I*

A basic varnish formula was prepared in which 42 lb. of 100% phenolic resin, 124 lb. of rosin-modified phenolic resin and 100 lb. of white refined linseed oil were weighed into a suitable processing kettle and the mixture heated to 560° F. and held at that temperature until a cold drop on a glass plate was clear (about 10 minutes). To this cook was added 300 lb. of china wood oil, the temperature adjusted to 450° F. and held until the desired viscosity was obtained (A–A2 on Gardner-Holdt bubble viscosimeter at 40.0%=1% non-volatile content as subsequently thinned). Solvents and thinners consisting of 114 lb. of dipentine and 690 lb. of mineral spirits were incorporated and the mixture cooled, after which 7.9 lb. of 24% lead naphthenate, 1.1 lb. of 6% manganese naphthenate, 2.2 lb. of 6% cobalt naphthenate and 1.95 lb. of 8% zinc naphthenate were added. 1% by weight of octadecyl beta-carbonxyadipate based on the nonvolatile content of the varnish was then added. This waxy triester was added by warming it in an approximately equal portion of mineral spirits until the wax was dissolved, followed by the admixing of the varnish and wax solution. The wax was compatible with the varnish, the latter drying rapidly to form a clear film which had a water-repellency rated as very good. The characteristics of a film with respect to water-repellency are determined by noting the contact angle of a drop of water deposited upon such film. Films exhibiting a contact angle of 72° or less are considered poor in water repellency. A contact angle of 99° is considered very good.

*Example II*

A basic gloss enamel was prepared by grinding 2.8 lbs. of rutile titanium dioxide, 1.68 lbs. of a 60% nonvolatile alkyd resin solution (pentaerythritol-phthalic anhydride, 50% soya oil modified), 5.5 g. soya lecithin and 0.60 lb. of mineral spirits in a laboratory pebble mill for 24 hours to a fineness of grind of 7 (measured on the Hegman fineness gauge). To this paste after grinding was added 2.95 lbs. additional alkyd resin solution, 7.1 g. soya-lecithin, 6.32 g. 6% cobalt naphthenate, 21 g. 24% lead naphthenate, 25.2 g. 5% calcium naphthenate, 4 g. of a volatile anti-skinning agent and .732 lbs. mineral spirits, resulting in a final viscosity of 72 Krebs units.

To this basic enamel was added 1% by weight based on the non-volatile content of octadecyl beta-carboxyadipate. Films formed from this composition exhibit a 60° specular gloss of 91 after one day and, after 22 days, 84. Specular gloss is defined as 1000 times the 60° specular reflectance of a sample measured according to the method, and with the apparatus prescribed in the ASTM Procedure D523–49T. The water repellency of the film after one day was rated as good, and after 22 days as very good.

*Example III*

A basic semi-gloss enamel is prepared by grinding together in a pebble mill 239 lbs. rutile titanium calcium pigment, 239 lbs. rutile titanium dioxide, 17.4 lbs. zinc oxide, 4.4 lbs. Nuact Paste (a metallic soap which preferentially adsorbs on $TiO_2$ pigment, described in "Ye Towne Drier," vol. 4, No. 20, April 1951—Nuodex Products Company, Elizabeth, New Jersey), 3.5 lbs. aluminum stearate, 261 lbs. of a 55% alkyd resin solution (same type used in gloss enamel) 8.7 lbs. bodied linseed oil and 42 lbs. of mineral spirits. To this, after grinding, is added 144 lbs. additional alkyl resin solution, 1.87 lbs. 6% cobalt naphthenate, 4.8 lbs. 24% lead naphthenate, 0.65 lb. of volatile anti-skinning agent and 140 lbs. mineral spirits.

1.5% by weight based on nonvolatiles of octadecyl beta-carboxyadipate was added to the semi-gloss enamel prepared as above described to give a water-repellency rated as very good.

*Example IV*

476 lbs. of rutile titanium calcium pigment, 86 lbs. rutile titanium dioxide, 96 lbs. calcium carbonate, 64.2 lbs. magnesium silicate and 4.0 lbs. aluminum stearate are ground in a roller or pebble mill with 1.2 lbs. Nuact Paste (an anti-drier adsorption agent), 14.55 lbs. above-mentioned wax examples 234 lbs. of a 50% nonvolatile content one-coat flat type alkyd resin solution (pentaerythritol-phthalic anhydride soya acids) and 20 lbs. mineral spirits. This is thinner with 22.4 lbs. of gloss oil, 1.0 lbs. 6% cobalt naphthenate, 2.39 lbs. 24% lead naphthenate, 0.36 lbs. of volatile anti-skinning agent, 7.0 lbs. of a proprietary puffing agent (Advance Solvents Company puffing agent) and 196 lbs. mineral spirits.

A wax-fortified one-coat flat paint is best made by grinding the wax into the paint in the pebble mill, although it can be incorporated by the same means as heretofore mentioned. It has been found that from 7.5–10.0% of a very effective water-repellent-inducing wax is required to give a good one-coat flat, which will have the necessary advantages due to wax fortification. 10% octadecyl beta-carboxyadipate based on nonvolatile vehicle gives good water repellency in such high-pigment content flat paints.

Although the specific examples are limited with respect to the synthetic wax to the octadecyl triester of beta-carboxyadipic acid, it is to be understood that such examples are intended to be illustrative rather than limiting. Other acids or alcohols may be employed without departing from the spirit of this invention.

Other exemplary tribasic acids suitable for use in preparing the waxy triesters of this invention are tricarballylic acid, or aromatic acids such as the three isomers of a benzene tricarboxylic acid. Additional examples of suitable alcohols are 1-eicosanal, 1-docosanol, or carnauba wax alcohol.

It should be appreciated that the compositions hereinbefore described are in no way intended to be limited as to their common constituents since the latter are well known in the art with the exception of the novel use of the waxy diesters and their quantity relationship to the compositions. Likewise, the method of manufacture as disclosed in the examples is not intended to be limited since it will be readily appreciated that the resulting compositions may be produced by other well-known methods.

I claim:

1. A permanent protective coating composition comprising organic paint and varnish resins dissolved in an organic solvent therefor, characterized by improved water repellency and mar and abrasion resistance and having dissolved therein 0.5 to about 10% by weight, based on the coating content, of a synthetic wax compatible with said resins, said synthetic wax being an ester of an acyclic alkanol of 16–30 carbon atoms and $\beta$-carboxy adipic acid.

2. The composition of claim 1 wherein the ester is the octadecyl ester of $\beta$-carboxy adipic acid.

References Cited in the file of this patent

UNITED STATES PATENTS 2,122,716    Graves  ------------------ July 5, 1938

UNITED STATES PATENT OFFICE
CERTIFICATE OF CORRECTION

Patent No. 2,893,964                                                       July 7, 1959

Edward A. Wilder

It is hereby certified that error appears in the printed specification of the above numbered patent requiring correction and that the said Letters Patent should read as corrected below.

Column 3, line 29, Example 1, for "beta-carbonxyadipate" read -- beta-carboxyadipate --; column 4, line 5, Example III, for "alkyl" read -- alkyd --; column 4, line 23, Example IV, for "thinner" read -- thinned --.

Signed and sealed this 17th day of May 1960.

(SEAL)
Attest:

KARL H. AXLINE                                                      ROBERT C. WATSON
Attesting Officer                                           Commissioner of Patents